United States Patent
Urac et al.

(10) Patent No.: US 7,857,578 B2
(45) Date of Patent: Dec. 28, 2010

(54) PRELOADING BRACE FOR GAS TURBINE ENGINE TRANSPORTATION

(75) Inventors: Tibor Urac, Toronto (CA); Yves Isabel, Montreal-Nord (CA); Gilles Beauvais, Pointes-aux-Trembles (CA); Sylvain Giroux, Ville Mercier (CA)

(73) Assignee: Pratt & Whitney Canada Corp., Longueuil (CA)

( * ) Notice: Subject to any disclaimer, the term of this patent is extended or adjusted under 35 U.S.C. 154(b) by 803 days.

(21) Appl. No.: 11/777,634

(22) Filed: Jul. 13, 2007

(65) Prior Publication Data
US 2009/0014609 A1    Jan. 15, 2009

(51) Int. Cl.
*F01D 25/16* (2006.01)

(52) U.S. Cl. ............ 415/107; 415/229; 415/214.1; 415/232

(58) Field of Classification Search ......... 415/107, 415/229, 214.1, 232
See application file for complete search history.

(56) References Cited

U.S. PATENT DOCUMENTS

| | | | |
|---|---|---|---|
| 4,660,796 A * | 4/1987 | Garrec | 248/544 |
| 4,668,109 A | 5/1987 | Basso | |
| 6,098,263 A * | 8/2000 | Subler et al. | 29/446 |
| 6,298,536 B1 | 10/2001 | Rossway et al. | |
| 6,883,224 B2 * | 4/2005 | Thomas | 29/559 |
| 7,103,952 B2 * | 9/2006 | Appleton et al. | 29/281.4 |

OTHER PUBLICATIONS

International Search Report of PCT/CA2008/001167.
SKF Product information 401: Bearing failures and their causes. Monograph [online]. SKF Group, 1994 [retrieved on Sep. 17, 2008]. Retrieved from the Internet: <URL:http://www.skf.com/portal/skf/home/aptitudexchange?contentid=0.237932.237933.237935.237962.238715>.
NTN Corporation Ball and Roller Bearings catalogue. Monograph [online], NTN Corporation, 2001 [retrieved on Sep. 17, 2008]. Retrieved from the Internet: <URL:http://directindustry.com/pdf/ntn/ball-and-roller-bearings/7395-25633-_96.html>.

* cited by examiner

*Primary Examiner*—Ninh H Nguyen
(74) *Attorney, Agent, or Firm*—Ogilvy Renault LLP

(57) ABSTRACT

An assembly for preventing damage to bearings of a gas turbine engine during transportation is provided. The assembly comprises a turbofan gas turbine engine having an engine casing and at least one turbine shaft supported by a plurality of bearings, and, a brace secured relative to the engine casing and biasing the shaft along an axial direction of the shaft.

19 Claims, 4 Drawing Sheets

PRELOADING BRACE FOR GAS TURBINE ENGINE TRANSPORTATION

TECHNICAL FIELD

The invention relates generally to gas turbine engines and, more particularly, to the prevention of engine bearing damage caused during the transportation of gas turbine engines.

BACKGROUND OF THE ART

During transportation, aircraft engines such as gas turbine engines must be handled carefully in order to avoid shock loading to engine bearings. Shock loading can occur during an impact, a drop or abrupt back and forth movements. When the engine rotor is not rotating and the engine bearings are supporting the weight of the rotor, only a few rolling elements are in contact with the raceways. In some cases, only two or three rolling elements may be in contact with the raceway of a particular bearing. Therefore, due to the relatively small contact area between the rolling elements and the raceway, a shock load while transporting the engine may result in a very high contact pressure between the rolling elements and the raceway which can be beyond the material's elasticity limit.

Consequently, this phenomenon can produce true brinelling defects in the bearing raceway. True brinelling defects are characterised by indentations or material deformations on the raceway which are of the shape of the contact area between the rolling elements and the raceway, and, are spaced according to the rolling element spacing. True brinelling defects in a bearing raceway can lead to vibrations and noisy engines particularly at slower rotational speeds or at run down and can lead to premature failure of the bearing. Conventional ball bearings are typically more prone to true brinelling damage, however this type of damage can also occur in roller bearings or the like.

Accordingly, there is a need to provide a solution through which engine bearing damage caused by shock loading during the transport of gas turbine engines may be prevented or reduced.

SUMMARY

It is therefore an object of this invention to provide an assembly which addresses the above mentioned concerns.

In one aspect, there is provided an assembly comprising: a turbofan gas turbine engine, the engine having an engine casing and at least one turbine shaft supported by a plurality of bearings, the bearings having a static portion mounted to the casing; a brace secured relative to the engine casing and disposed in contact with a rotating member of the engine mounted to the shaft, the brace biasing the shaft along an axial direction of the shaft.

There is also provided, in accordance with another aspect, an assembly comprising: a turbofan gas turbine engine having a fan mounted to a fan shaft, the fan shaft being supported on bearings and the bearings being secured to an engine casing; and means for axially biasing the fan shaft relative to the engine casing.

There is further provided, in accordance with another aspect, a method for transporting a turbofan gas turbine engine, wherein the engine comprises a turbine shaft having a rotating member mounted thereto, the shaft being supported by a plurality of bearings, the engine having a casing to which a static portion of the bearings are mounted, the method comprising the steps of: a) exerting a force on the shaft in relation to the static portion of the bearings, the force being exerted along a central axis of the shaft; b) transporting the engine; and c) removing the force on the shaft prior to the operation of the engine.

Further details of these and other aspects of the present invention will be apparent from the detailed description and figures included below.

DESCRIPTION OF THE DRAWINGS

Reference is now made to the accompanying figures depicting aspects of the present invention, in which.

DETAILED DESCRIPTION OF THE PREFERRED EMBODIMENTS

Figure 1:
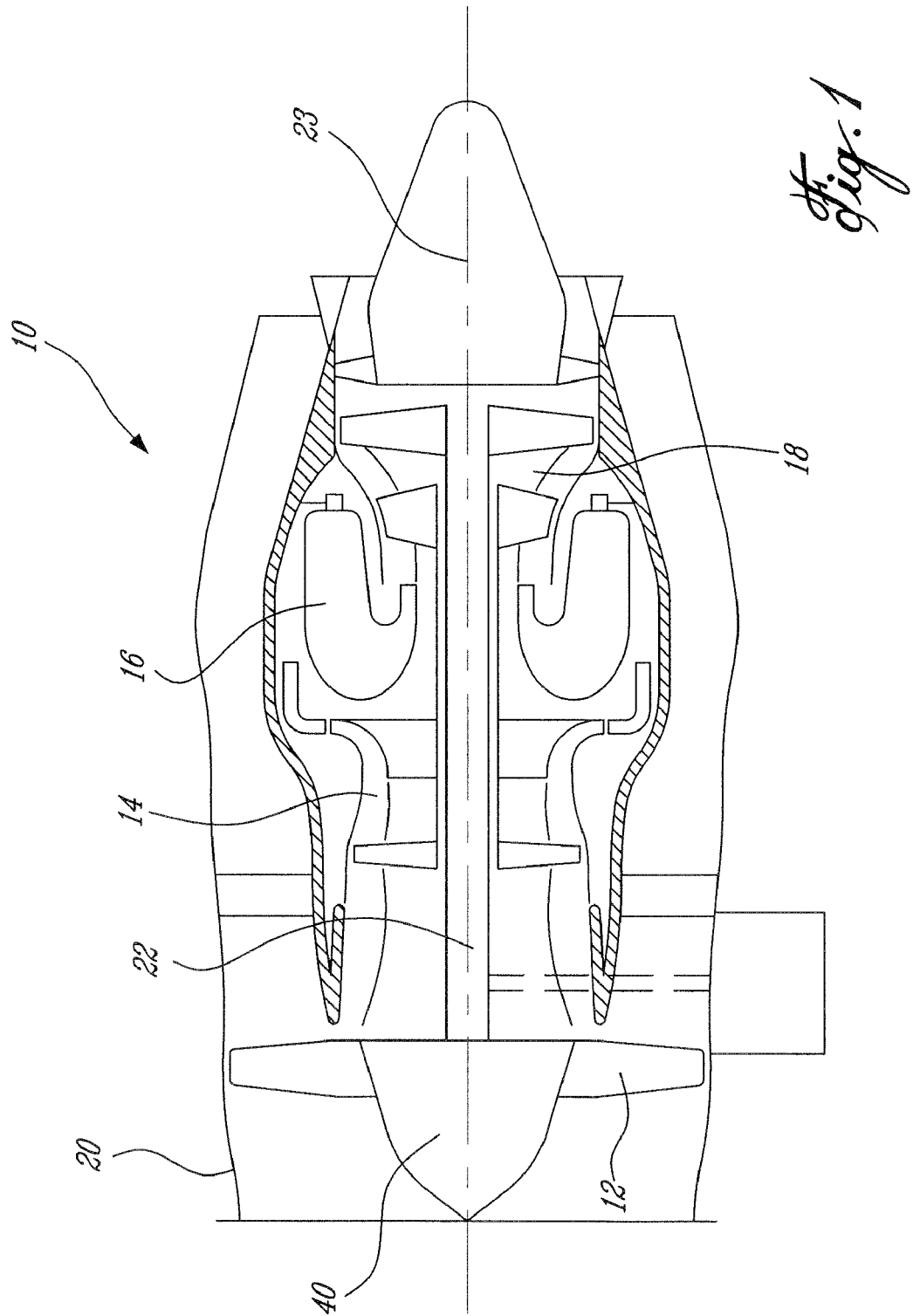
FIG. 1 is a schematic axial cross-section view of a gas turbine engine.

FIG. 1 illustrates a turbofan gas turbine engine 10 of a type preferably provided for use in subsonic flight, generally comprising in serial flow communication a fan 12 through which ambient air is drawn, a multistage compressor 14 for pressurizing the air, a combustor 16 in which the compressed air is mixed with fuel and ignited for generating an annular stream of hot combustion gases, and a turbine section 18 for extracting energy from the combustion gases.

The fan 12 is a rotating member of the gas turbine engine 10 and is disposed within a static fan case 20 which defines a fan inlet. The fan 12 is secured to a main shaft 22 which is supported within the engine 10 by a plurality of engine bearings which are not shown. The fan 12 and the shaft 22 have a common central axis of rotation 23. The types of bearings that are used to support the shaft 22 typically comprise rolling elements and a raceway disposed on a static portion of the bearing that is mounted to a static casing of the engine. These types of bearings may experience true brinelling damage when subjected to significant shock loading during, for example, transportation of the engine 10.

Figure 2:
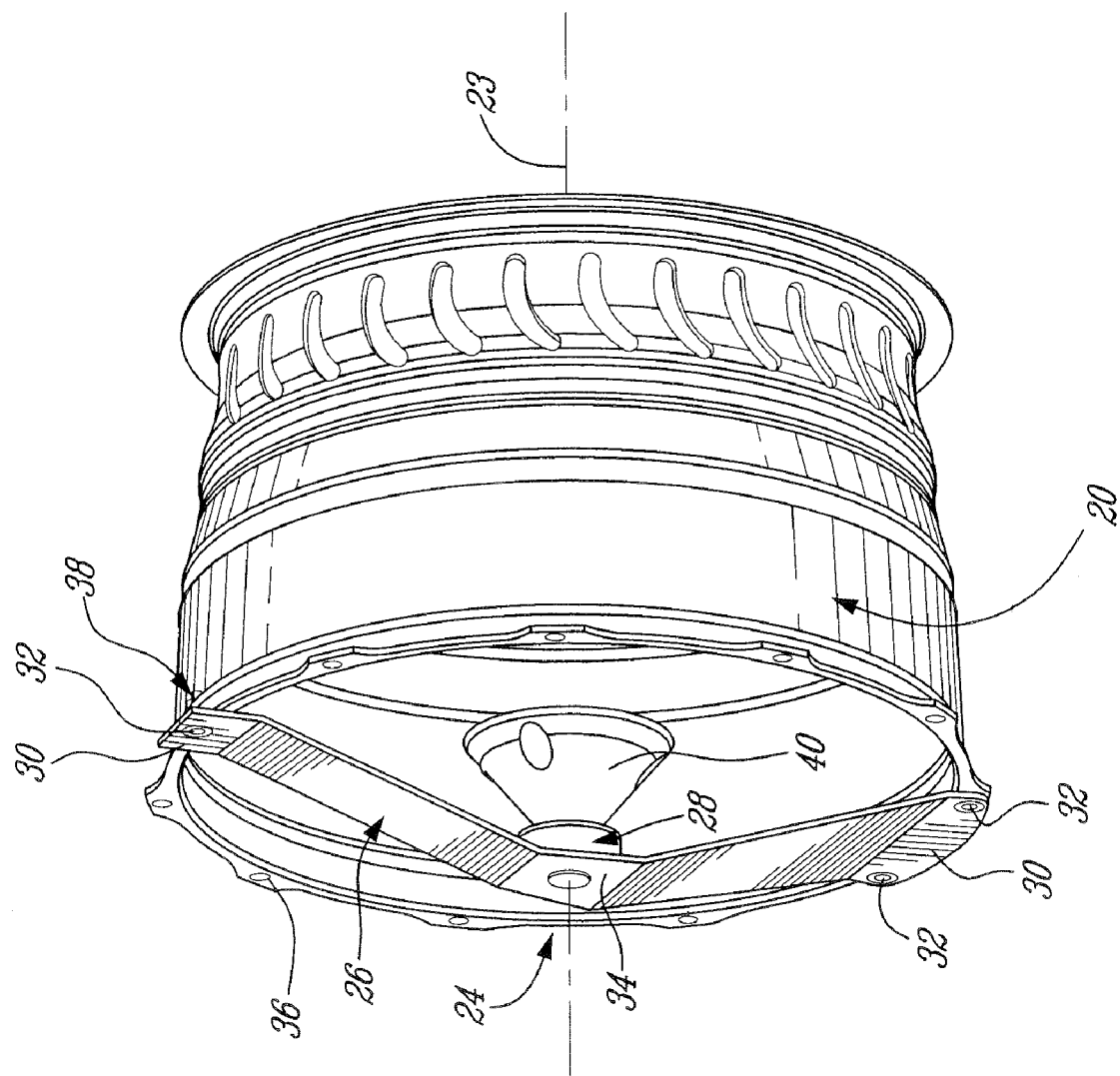
FIG. 2 is an isometric view of a brace according to one embodiment of the present invention, secured to a fan case of the gas turbine engine of FIG. 1.
Figure 4:
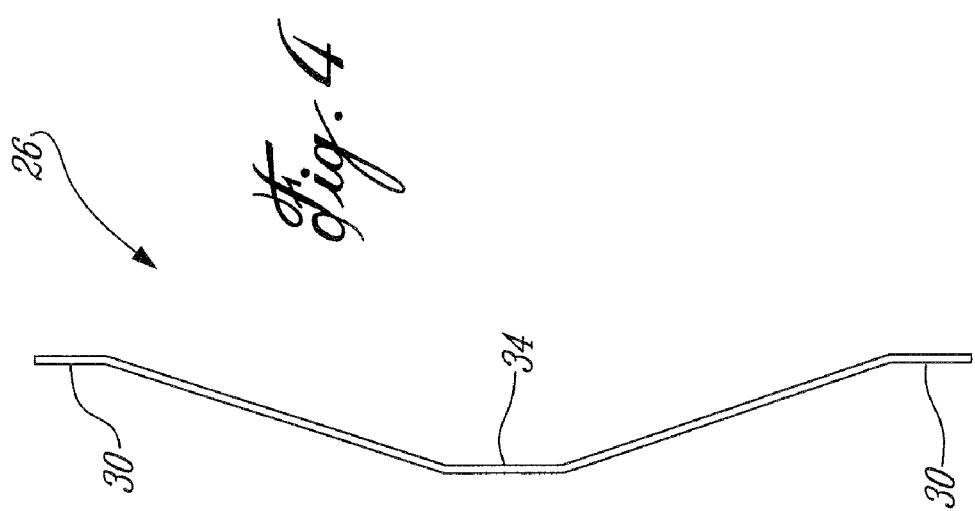
FIG. 4 is a side elevation view of the bracing member of FIG. 2.
Figure 3:
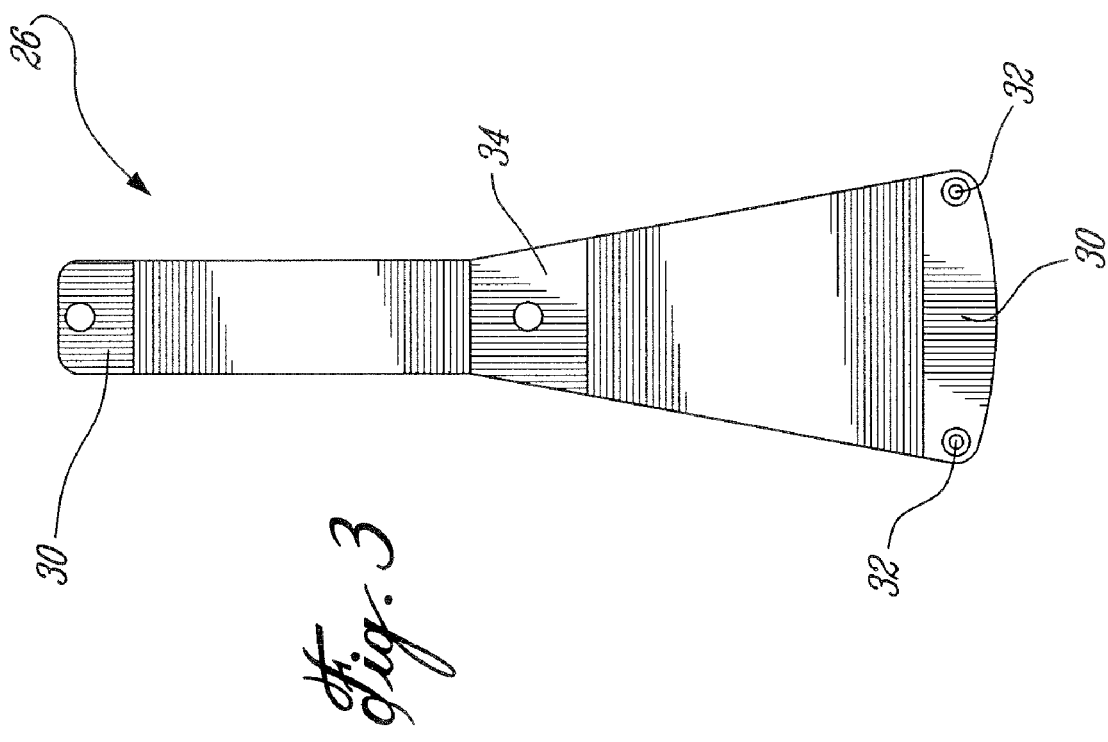
FIG. 3 is a front elevation view of a bracing member of the brace of FIG. 2.
Figure 5:
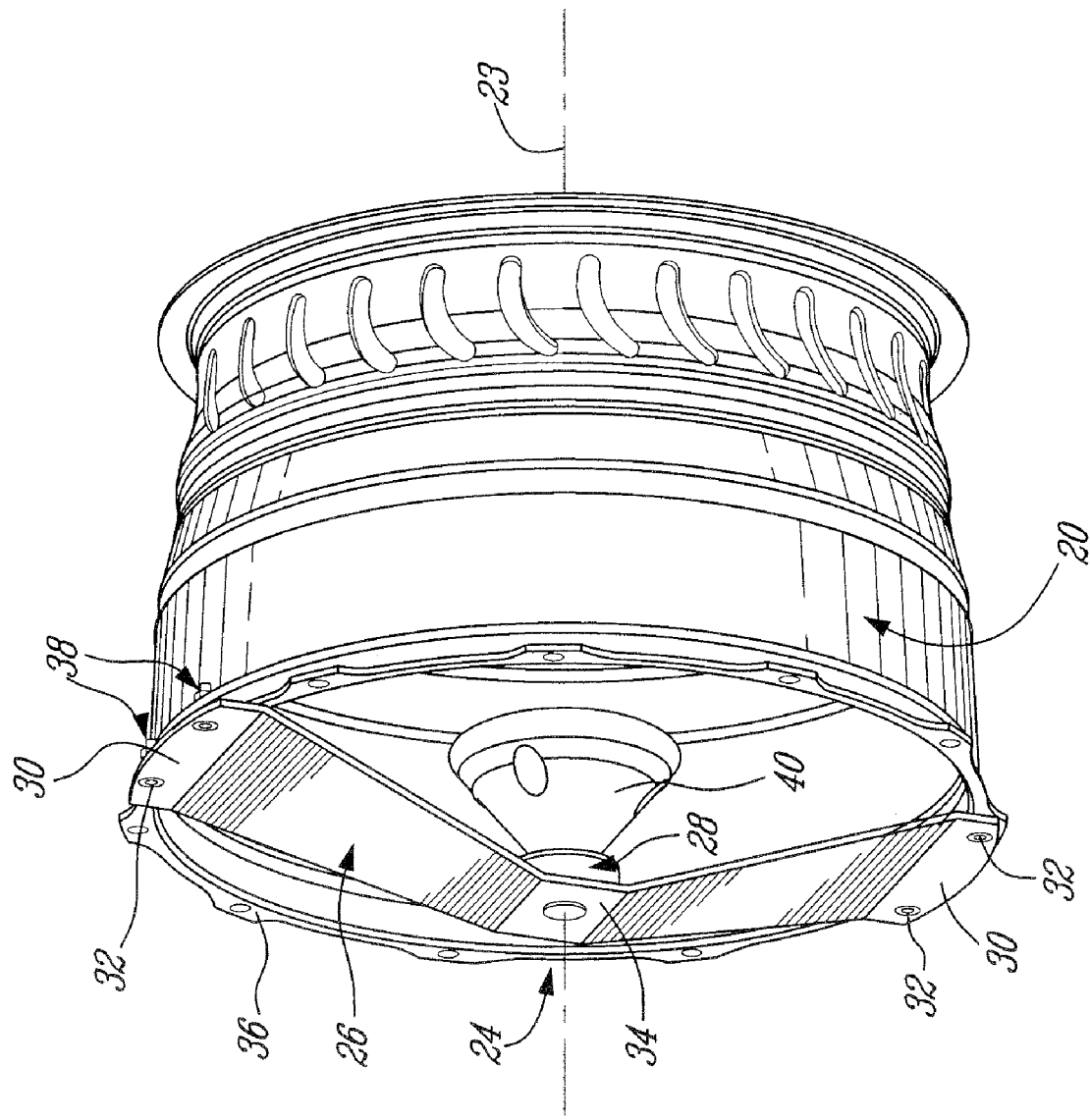
FIG. 5 is an isometric view of a brace according to another embodiment of the present invention, secured to a fan case of a different configuration.

FIG. 2 shows a brace 24 that is removably secured to the fan case 20. The brace 24 comprises a bracing member 26 and a load transfer member 28 disposed on the bracing member 26. A front view and a side view of the bracing member 26 are shown in FIGS. 3 and 4 respectively. The bracing member 26 has two mounting portions 30 wherein each mounting portion 30 has one or more holes 32 that are used to secure the bracing member 26 to the fan case 20. The two mounting portions 30 are located at opposite ends of the bracing member 26. The bracing member 26 also comprises a holding portion 34 on which the load transfer member 28 is disposed. The holding portion 34 is located approximately mid-span between the two mounting portions 30. FIG. 5 shows another brace 24 wherein the mounting portions 30 are adapted to be secured to a fan case 20 having a different configuration.

The brace 24 is removably secured to the fan case 20 prior to the transport of the gas turbine engine 10 in order to prevent or reduce damage to the engine bearings, especially true brinelling defects, caused by shock loading. The bracing member 26 is secured to the fan case 20 by fastening the mounting portions 30 to a flange 36 of the fan case 20 using bolts 38. During packaging of the gas turbine engine 10 prior to transportation, the brace 24 is installed and the gas turbine engine 10 may be packaged or prepared in accordance with conventional procedures. The brace 24 is intended to be reusable and must be removed prior to the operation of the gas turbine engine 10.

When the brace 24 is removably secured to the fan case 20, the holding portion 34 of the bracing member 26 urges the load transfer member 28 against a nose cone 40 of the fan 12. The nose cone 40 is shown in FIGS. 2 and 5 for clarity. Accordingly, an axial preloading force is applied to the fan 12 in a direction parallel to the central axis of rotation 23 and transferred to the bearings via the shaft 22. This axial force causes all the rolling elements of one or more bearings supporting the shaft 22 to become seated against their respective raceway. Since all the rolling elements of the bearing are kept in contact with the raceway, a larger contact area is provided for transmitting the forces induced by shock loading during transportation of the gas turbine engine 10. Hence, the true brinelling damage that can occur during engine transportation, when only a few rolling elements are in contact with the raceway, is prevented or significantly reduced. Consequently, the installation of the brace 24 also limits the unwanted movement of the fan relative to the fan case 20.

Referring to FIGS. 1 and 2, the load transfer member 28 transfers the axial load from the bracing member 26 to the nose cone 40 of the fan 12 by pushing against the nose cone 40 and thereby biasing the shaft along a downstream direction relative to the turbine engine 10. The direction in which the axial force should be applied to the fan 12 along the central axis 23 will depend on the type of bearings that are used to support the shaft 22. In any case, the magnitude of the axial preloading force should be sufficient to cause all the rolling elements of at least one bearing to become seated against the raceway. Typically, the preload force required ranges from 30 lbs to 100 lbs for an engine of the type shown in FIG. 1.

The load transfer member 28 may be ring-shaped to receive the nose cone 40 of the fan 12 and may comprise a resilient and/or compressible material which allows the load transfer member 28 to be held in a compressed state against the nose cone 40 of the fan 12. For example, in the case where the load transfer member 28 comprises a resilient material, the spacing between the bracing member 26 and the nose cone 40 may be such that when the bracing member 26 is installed, the load transfer member 28 is in a compressed state and therefore urges the nose cone 40 of the fan 12 away from the bracing member 26. Suitable materials that may be used for the load transfer member 28 are for example Styrofoam™, rubber or the like. The load transfer member 28 may be affixed to the bracing member 26 or may be separate and simply compressed between the bracing member 26 and the nose cone 40. It will be apparent to one skilled in the art that other configurations of load transfer members could also be used. For example a spring-loaded pad urging the fan 12 away from the bracing member 26 would achieve similar results.

Alternatively or in combination with a resilient and/or compressible load transfer member 28, the bracing member 26 itself may be designed to be flexible and resilient. For example, in such case the bracing member 26 would be secured to the fan case 20 in a deflected or biased state and would thereby urge the load transfer member 28 against the nose cone 40 of the fan 12 in order to exert a suitable axial preload force.

The above description is meant to be exemplary only, and one skilled in the art will recognize that changes may be made to the embodiments described without department from the scope of the invention disclosed. For example, it is apparent that providing a brace that is adapted to be secured to a static component or casing of the gas turbine engine 10 other than the fan case 20 is also feasible. Alternatively, the brace could also be secure to or form part of a shipping container in which the gas turbine engine is packaged during transportation in order to exert an axial force on the shaft 22 relative to the static portion of the bearings. Further, the axial preload force could be transmitted to a different location on the fan 12 or to another rotating member mounted on the shaft 22 in order to cause the rolling elements of at least one bearing supporting the shaft 22 to become seated on the raceway. It is also apparent that the brace 24 described above can be fabricated using conventional manufacturing procedures using suitable materials that would be apparent to a person skilled in the relevant art. Furthermore, it is apparent that the use of such brace is not limited to turbofan gas turbine engines but could also be useful for the transport of other types of turbines or rotary machinery where similar brinelling damage to support bearings may be of concern. Still other modifications which fall within the scope of the present invention will be apparent to those skilled in the art, in light of a review of this disclosure, and such modifications are intended to fall within the appended claims.

What is claimed is:

1. An assembly comprising:
   a turbofan gas turbine engine, the engine having an engine casing and at least one turbine shaft supported by a plurality of bearings, the bearings having a static portion mounted to the casing; and
   a brace secured relative to the engine casing and disposed in contact with a rotating member of the engine mounted to the shaft, the brace biasing the shaft along an axial direction of the shaft.

2. The assembly as defined in claim 1, wherein the brace is mounted directly to the engine casing.

3. The assembly as defined in claim 2, wherein the brace is secured to the engine casing at two locations, and contacts the rotating member mid-span of the two locations.

4. The assembly as defined in claim 1, wherein the brace includes a resilient member in contact with the rotating member of the engine.

5. The assembly as defined in claim 1, wherein the rotating member is a fan, and the brace contacts a nose cone of the fan.

6. The assembly as defined in claim 1, wherein the brace is resilient.

7. An assembly comprising:
   a turbofan gas turbine engine having a fan mounted to a fan shaft, the fan shaft being supported on bearings and the bearings being secured to an engine casing; and
   means for axially biasing the fan shaft relative to the engine casing, the means engaging a nose cone of the fan.

8. The assembly as defined in claim 7, wherein the means comprises a resilient member disposed between the fan and a brace fixed relative to the engine casing.

9. The assembly as defined in claim 8, wherein the resilient member is held in a compressed state against the fan.

10. The assembly as defined in claim 7, wherein the means is disposed diametrically across a fan inlet of the engine.

11. A method for transporting a turbofan gas turbine engine, wherein the engine comprises a turbine shaft having a rotating member mounted thereto, the shaft being supported by a plurality of bearings, the engine having a casing to which a static portion of the bearings are mounted, the method comprising the steps of:

a) exerting a force on the shaft in relation to the static portion of the bearings, the force being exerted along a central axis of the shaft;
b) transporting the engine; and
c) removing the force on the shaft prior to the operation of the engine.

12. The method as defined in claim 11 wherein the force is exerted by mounting a brace biased against the rotating member.

13. The method as defined in claim 11, wherein the force exerted is sufficient to cause all rolling elements of at least one bearing to become seated to a raceway disposed on the static portion of the at least one bearing.

14. The method as defined in claim 11, wherein the force is exerted in a downstream direction relative to the engine.

15. The method as defined in claim 11, wherein a magnitude of the force is from 30 lbs to 100 lbs inclusively.

16. The method as defined in claim 11, further comprising:
i) packaging the engine to be ready for transportation, prior to the transporting step b).

17. The method as defined in claim 11, wherein the force of step a) is exerted to the shaft via a fan that is mounted to the shaft.

18. The method as defined in claim 11, wherein the exerting step a) includes securing a brace to the casing of the engine and biasing the brace against a fan that is mounted to the shaft.

19. The method as defined in claim 18, wherein the brace comprises a resilient member that is biased in a compressed state against a nose cone of the fan.

* * * * *